United States Patent
Shih et al.

(10) Patent No.: US 12,468,417 B2
(45) Date of Patent: Nov. 11, 2025

(54) TOUCH AND DISPLAY INTEGRATED CIRCUIT AND TOUCH AND DISPLAY DEVICE

(71) Applicant: Novatek Microelectronics Corp., Hsinchu (TW)

(72) Inventors: Wei-Lun Shih, Hsinchu (TW); Chun-Hung Chen, Taipei (TW); Yu-Ying Tang, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/733,810

(22) Filed: Jun. 4, 2024

(65) Prior Publication Data

US 2025/0306699 A1 Oct. 2, 2025

(30) Foreign Application Priority Data

Mar. 27, 2024 (TW) .................................. 113111371

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05)

(58) Field of Classification Search
CPC ... G06F 3/04164; G06F 3/0446; G06F 3/0412
See application file for complete search history.

(56) References Cited

U.S. PATENT DOCUMENTS

| | | |
|---|---|---|
| 11,573,653 B2 | 2/2023 | Tsai |
| 2016/0266684 A1* | 9/2016 | Lee ...................... G06F 3/0412 |
| 2022/0121302 A1 | 4/2022 | Tsai |
| 2023/0161442 A1 | 5/2023 | Heo et al. |
| 2024/0065070 A1* | 2/2024 | Tanaka .................. H10K 59/12 |

FOREIGN PATENT DOCUMENTS

| | | |
|---|---|---|
| TW | 202215210 | 4/2022 |
| TW | 202217531 | 5/2022 |

OTHER PUBLICATIONS

"Office Action of Taiwan Counterpart Application", issued on Jan. 3, 2025, p. 1-p. 3.

* cited by examiner

*Primary Examiner* — Peter D Mcloone
(74) *Attorney, Agent, or Firm* — JCIPRNET (57) ABSTRACT

A touch and display integrated circuit (IC) and a touch and display device are disclosed. The touch and display IC includes a first display driving pad set, a second display driving pad set, first touch pad sets, and second touch pad sets. The first display driving pad set and the second display driving pad set are respectively connected to a first display driver and a second display driver on a touch display device through first leading wires. The first touch pad sets are connected to a touch circuit on the touch display device through second leading wires. The second touch pad sets are connected to the touch circuit through third leading wires. The first touch pad sets and the second touch pad sets are disposed between the first display driving pad set and the second display driving pad set, thereby reducing signal interference.

11 Claims, 12 Drawing Sheets

TOUCH AND DISPLAY INTEGRATED CIRCUIT AND TOUCH AND DISPLAY DEVICE

CROSS-REFERENCE TO RELATED APPLICATION

This application claims the priority benefit of Taiwan application serial no. 113111371, filed on Mar. 27, 2024. The entirety of the above-mentioned patent application is hereby incorporated by reference herein and made a part of this specification.

BACKGROUND

Technical Field

This disclosure relates to an electronic device, and in particular to a touch and display integrated circuit and a touch and display device.

Description of Related Art

Figure 1:
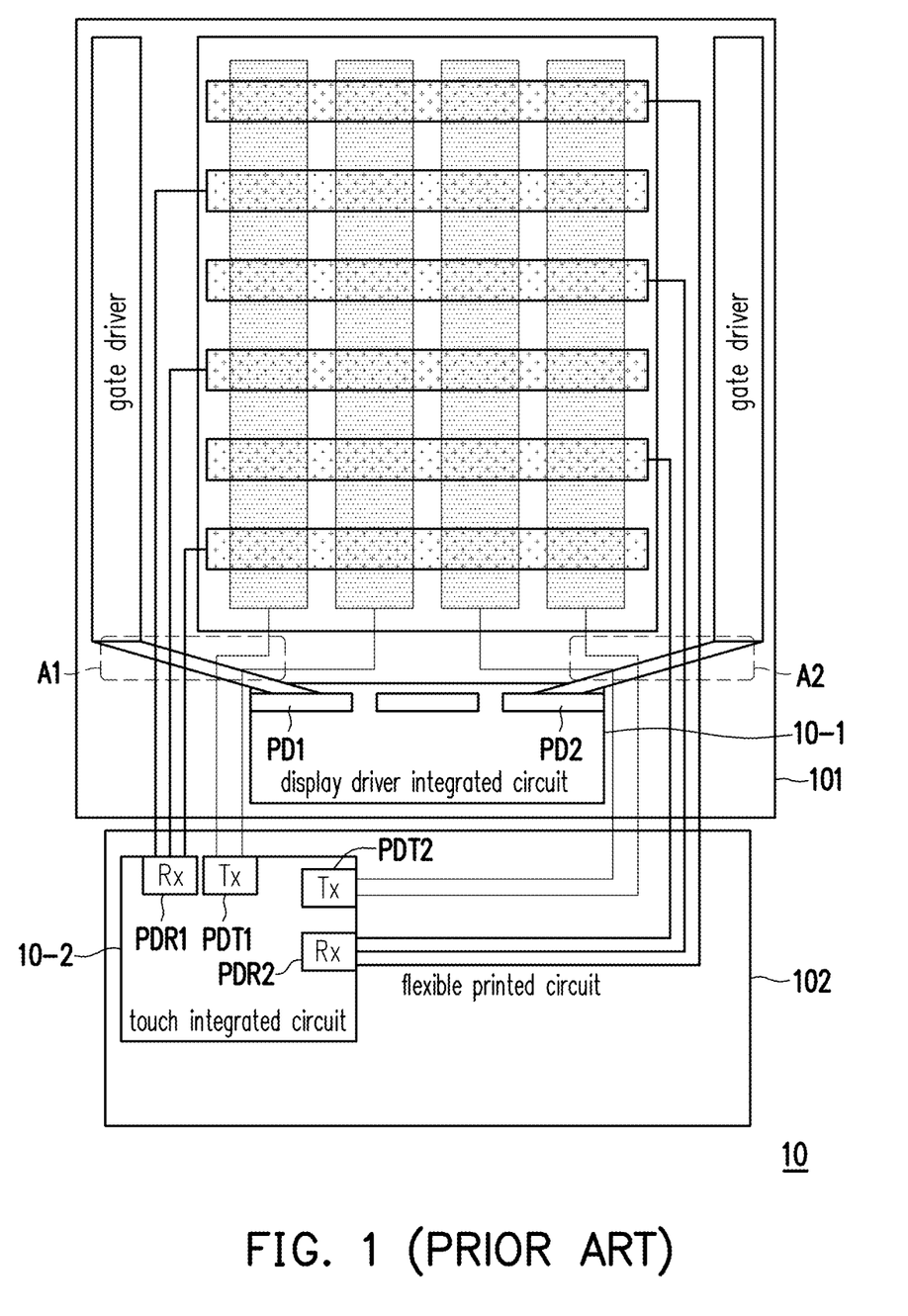
FIG. 1 is a circuit diagram of a current touch and display device.

FIG. 1 is a circuit diagram of a current touch and display device. Referring to FIG. 1, a touch and display device 10 may include a display driver integrated circuit (DDIC) 10-1 disposed on a panel 101, and a touch integrated circuit 10-2 disposed on a flexible printed circuit (FPC) 102. The DDIC 10-1 connects multiple gate drivers disposed on the panel 101 through multiple pads PD1 to PD2 and multiple corresponding leading wires. In addition, the touch integrated circuit 10-2 is connected from the FPC 102 to multiple transmitting electrodes disposed on the panel 101 through multiple pads PDT1 to PDT2 and multiple corresponding leading wires. The touch integrated circuit 10-2 is also connected to multiple receiving electrodes disposed on the panel 101 through multiple other pads PDR1 to PDR2 and multiple corresponding leading wires.

However, in regions A1 or A2, multiple leading wires between the current DDIC 10-1 and any one of the gate drivers intersect with other leading wires on the panel 101. Other leading wires include, for example, multiple leading wires between the touch integrated circuit 10-2 and any one of the transmitting electrodes, and multiple leading wires between the touch integrated circuit 10-2 and any one of the receiving electrodes. That is, the leading wires applied to gate driving intersect with the leading wires applied to touch on the panel 101. In this case, a signal applied to gate driving and a signal applied to touch interfere with each other, resulting in the signal-to-noise ratio (SNR) degradation described above.

SUMMARY

Embodiments of the disclosure provide a touch and display integrated circuit, capable of reducing interference between signals applied to display and touch.

The touch and display integrated circuit of the embodiment of the disclosure is adapted to drive a touch display device. The touch and display integrated circuit includes a first display driving pad set, a second display driving pad set, multiple first touch pad sets, and multiple second touch pad sets. The first display driving pad set and the second display driving pad set are respectively connected to a first display driver and a second display driver on the touch display device through multiple first leading wires. The first touch pad sets are connected to a touch circuit on the touch display device through multiple second leading wires. The second touch pad sets are connected to the touch circuit through multiple third leading wires. The first touch pad sets and the second touch pad sets are disposed between the first display driving pad set and the second display driving pad set.

The embodiment of the disclosure further provides a touch and display device. The touch and display device includes a touch display device and a touch and display integrated circuit. The touch display device includes a first display driver, a second display driver, a touch circuit, and a touch display device. The touch and display integrated circuit is configured to drive the touch display device. The touch and display integrated circuit includes a first display driving pad set, a second display driving pad set, multiple first touch pad sets, and multiple second touch pad sets. The first display driving pad set and the second display driving pad set are connected to the first display driver and the second display driver respectively through multiple first leading wires. The first touch pad sets are connected to the touch circuit through multiple second leading wires. The second touch pad sets are connected to the touch circuit through multiple third leading wires. The first touch pad sets and the second touch pad sets are disposed between the first display driving pad set and the second display driving pad set.

Based on the above, in the touch and display integrated circuit and the touch display device of the embodiment of the disclosure, by disposing multiple touch pad sets and multiple second touch pad sets between two display driving pad sets applied to the display driver, the first leading wires on the display panel may not intersect with various leading wires applied to touch. In this way, interference between signals applied to display and touch may be reduced for the touch and display integrated circuit and the touch display device, thereby improving a signal-to-noise ratio of the signal in the touch display device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Some embodiments of the disclosure will be described in detail below with reference to the accompanying drawings. The reference numerals cited in the following description will be regarded as the same or similar elements when the same reference numeral appears in different drawings. These embodiments are only part of the disclosure and do not disclose all possible implementations of the disclosure. Rather, these embodiments are merely examples within the scope of the disclosure.

Figure 2:
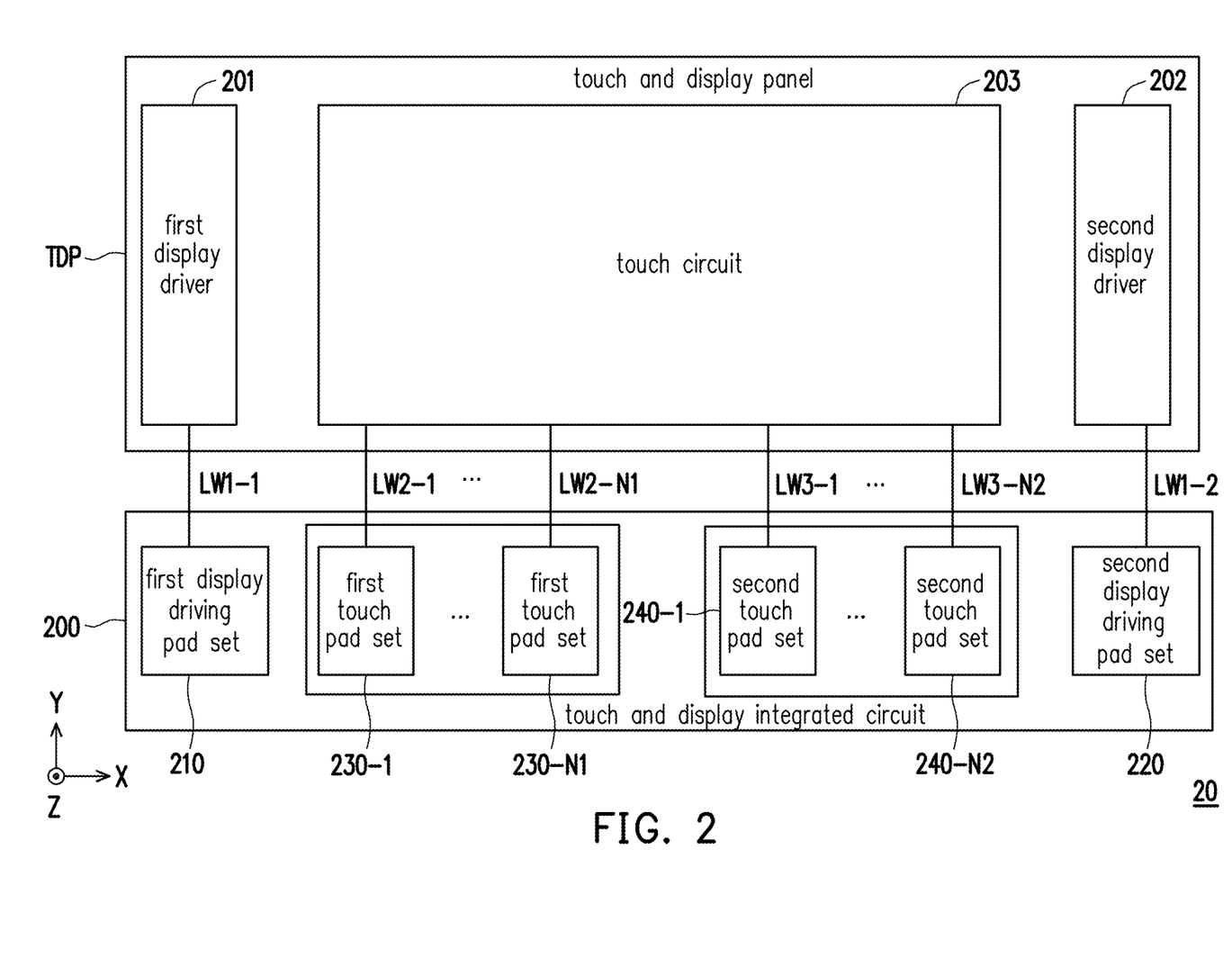
FIG. 2 is a block diagram of a touch and display device according to an embodiment of the disclosure.

FIG. 2 is a block diagram of a touch and display device according to an embodiment of the disclosure. Referring to FIG. 2, a touch and display device 20 may include a touch and display integrated circuit 200 and a touch display device TDP. The touch and display integrated circuit 200 connects the touch display device TDP through multiple leading wires. The touch and display integrated circuit 200 is configured to drive the touch display device TDP.

In this embodiment, the touch display device TDP may be, for example, a panel that applies a touch function and an organic light-emitting diode (OLED) to provide a display function. The touch display device TDP may include a first display driver 201, a second display driver 202, a touch circuit 203, and a pixel circuit (not shown in FIG. 2). The first display driver 201 and the second display driver 202 are respectively coupled to the pixel circuit to transmit corresponding control signals to the pixel circuit. The touch circuit 203 overlaps with the pixel circuit in the Z direction.

In this embodiment, the touch and display integrated circuit 200 may be, for example, a touch and display driver integration (TDDI) integrated circuit that integrates a display driver integrated circuit and a touch integrated circuit. The touch and display integrated circuit 200 may include a first display driving pad set 210, a second display driving pad set 220, multiple first touch pad sets 230-1 to 230-N1, and multiple second touch pad sets 240-1 to 240-N2, where N1 and N2 are positive integers greater than 1 respectively. N1 may or may not be the same as N2. The pad sets 210, 220, 230-1 to 230-N1, and 240-1 to 240-N2 are disposed side by side in the same direction (e.g., the X direction).

In this embodiment, the first display driving pad set 210 is connected to the first display driver 201 through multiple first leading wires LW1-1 to transmit corresponding control signals to the first display driver 201. The second display driving pad set 220 is connected to the second display driver 202 through other first leading wires LW1-2 to transmit corresponding control signals to the second display driver 202.

In this embodiment, multiple first touch pad sets 230-1 to 230-N1 are respectively connected to the touch circuit 203 through multiple second leading wires LW2-1 to LW2-N1 to transmit corresponding driving signals or sensing signals between the touch circuit 203 and the touch and display integrated circuit 200.

In this embodiment, multiple second touch pad sets 240-1 to 240-N2 are respectively connected to the touch circuit 203 through multiple third leading wires LW3-1 to LW3-N2 to transmit corresponding driving signals or sensing signals between the touch circuit 203 and the touch and display integrated circuit 200.

It should be noted that multiple first touch pad sets 230-1 to 230-N1 and multiple second touch pad sets 240-1 to 240-N2 are disposed between the first display driving pad set 210 and the second display driving pad set 220. That is, in the X direction, relative to the remaining pad sets 230-1 to 230-N1 and 240-1 to 240-N2, the first display driving pad set 210 and the second display driving pad set 220 are disposed on the outermost two sides of the touch and display integrated circuit 200.

It should be noted that since the multiple first touch pad sets 230-1 to 230-N1 and the multiple second touch pad sets 240-1 to 240-N2 are all disposed between the first display driving pad set 210 and the second display driving pad set 220, the multiple leading wires LW2-1 to LW2-N1 and LW3-1 to LW3-N2 connected to the touch circuit 203 do not intersect with any one of the first leading wires LW1-1 and LW1-2 in the X-Y plane. In this way, the various signals transmitted in the multiple leading wires LW1-1 to LW1-2 and the multiple leading wires LW2-1 to LW2-N1, as well as in the multiple leading wires LW1-1 to LW1-2 and the multiple leading wires LW3-1 to LW3-N2 do not interfere with each other, thus improving the signal-to-noise ratio of the signals applied to the touch and display device 20.

Figure 3:
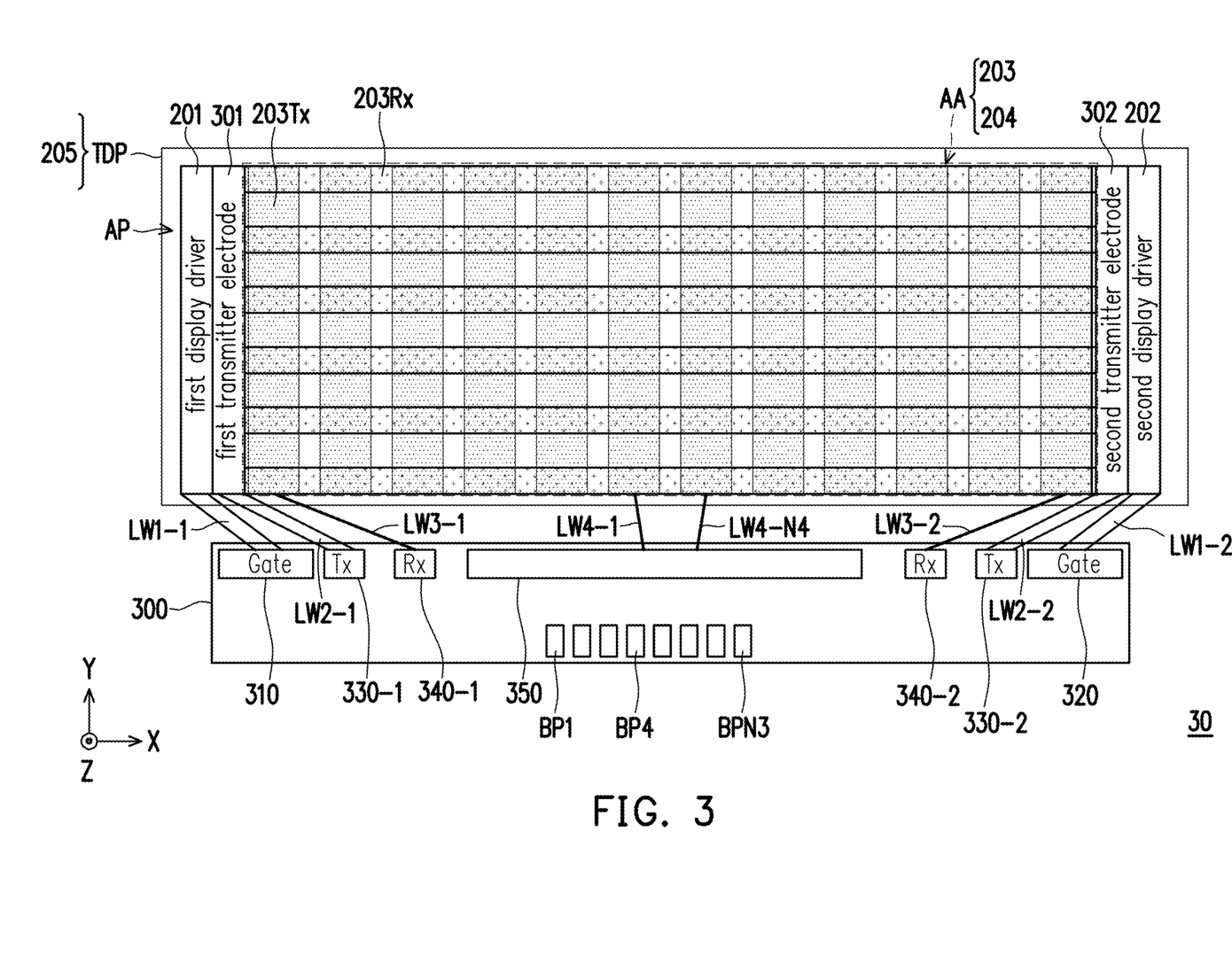
FIG. 3 is a circuit diagram of a touch and display device according to another embodiment of the disclosure.

FIG. 3 is a circuit diagram of a touch and display device according to another embodiment of the disclosure. Referring to FIG. 3, a touch and display device 30 may include a touch and display integrated circuit 300 and a touch display device TDP. The touch and display integrated circuit 300 may include a first display driving pad set 310, a second display driving pad set 320, multiple first touch pad sets 330-1 to 330-2, and multiple second touch pad sets 340-1 to 340-2. The touch display device TDP, the first display driving pad set 310, the second display driving pad set 320, multiple first touch pad sets 330-1 to 330-2, and multiple second touch pad sets 340-1 to 340-2 may be described with reference to and by analogy with the touch and display device 20. The quantities of the touch pad sets 330-1 to 330-2 and 340-1 to 340-2, and the corresponding leading wires LW2-1 to LW2-2 and LW3-1 to LW3-2 are only examples.

In the embodiment of FIG. 3, in the X-Y plane, the touch display device TDP may include a peripheral region AP and an active region AA. The peripheral region AP surrounds the active region AA. In the active region AA, the touch display device TDP may include a touch circuit 203 and a pixel circuit 204. In one embodiment, a first display driver 201, a second display driver 202, a first transmitter electrode 301, a second transmitter electrode 302, and a receiver electrode (not shown) may be disposed on the peripheral region AP.

In this embodiment, the first display driver 201 may be, for example, a gate driver, and is disposed on one side of the peripheral region AP (e.g., the left side of FIG. 3). The second display driver 202 may be, for example, a gate driver, and is disposed on the other side of the peripheral region AP (e.g., the right side of FIG. 3). The first display driver 201 and the second display driver 202 are respectively configured to transmit corresponding gate driving signals to multiple pixel units located in the odd-numbered columns and even-numbered columns in the pixel circuit 204.

In another embodiment, based on the size design of the touch and display device 30, the touch and display integrated circuit 300 may include one or more gate drivers. For example, in large-size design applications, the touch and display integrated circuit 300 may include one or more gate drivers other than the first display driver 201 and the second display driver 202.

In another embodiment, the first display driver 201 and the second display driver 202 may each be, for example, a gate driver on array (GOA, described below as a GOA circuit). Different from the gate driver, the GOA circuit is directly fabricated on a substrate 205 (i.e., a glass substrate) of the touch display device TDP, and the GOA circuit may include one or more sub-GOA circuits. The sub-GOA circuits respectively control corresponding gate lines (not shown) in the pixel circuit 204. The touch and display integrated circuit 300 sends one or more starting signals (not shown in the figure) to the first display driver 201 and the second display driver 202 through the first display driving pad set 310 and the second display driving pad set 320. The starting signal may be, for example, a starting vertical (STV) signal. Then, the touch and display integrated circuit 300 sequentially drives corresponding gate lines according to the starting signal(s) through the GOA circuit (i.e., the first display driver 201 and the second display driver 202). In other words, the touch and display integrated circuit 300 only sends the starting signal to the first display driver 201 and the second display driver 202. The signal used to drive the gate lines is generated by the first display driver 201 and the second display driver 202 according to the received starting signal.

In another embodiment, based on the size design of the touch and display device 30, the touch and display integrated circuit 300 may include one or more GOA circuits. For example, in large-size design applications, the touch and display integrated circuit 300 may include one or more GOA circuits other than the first display driver 201 and the second display driver 202.

In the embodiment of FIG. 3, the touch circuit 203 may include multiple transmitting electrodes 203Tx and multiple receiving electrodes 203Rx. Each of the transmitting electrodes 203Tx extends in the Y direction, for example. Each of the receiving electrodes 203Rx extends in the X direction, for example. In the X-Y plane, projections of the transmitting electrodes 203Tx and the receiving electrodes 203Rx onto the substrate 205 of the touch display device TDP are interlaced. The transmitting electrodes 203Tx and the receiving electrodes 203Rx may be, for example, indium tin oxide (ITO) electrodes or other transparent conductive materials. The respective quantities of the transmitting electrodes 203Tx and the receiving electrodes 203Rx are for example only and are illustrated by a single symbol respectively.

In this embodiment, the first transmitter electrode 301 is disposed on one side of the peripheral region AP (e.g., the left side of FIG. 3), and is disposed between the first display driver 201 and the touch circuit 203. The first transmitter electrode 301 is connected to a portion of the transmitting electrodes 203Tx. In addition, the second transmitter electrode 302 is disposed on the other side of the peripheral region AP (e.g., the right side of FIG. 3), and is disposed between the second display driver 202 and the touch circuit 203. The second transmitter electrode 302 is connected to another portion of the transmitting electrodes 203Tx. In one embodiment, the receiver electrode is disposed within the touch display device TDP and connected to the receiving electrodes 203Rx.

In this embodiment, the first touch pad sets 330-1 to 330-2 are respectively connected to the first transmitter electrode 301 and the second transmitter electrode 302 through multiple second leading wires LW2-1 to LW2-2 for further connecting the transmitting electrodes 203Tx. The first touch pad set 330-1 may include multiple pads, and is exemplified by a single block. The first touch pad set 330-1 is configured to output the corresponding driving signal to the transmitting electrode 203Tx. The first touch pad set 330-2 may be described with reference to and by analogy with the first touch pad set 330-1.

In this embodiment, multiple second touch pad sets 340-1 to 340-2 are respectively connected to multiple receiving electrodes 203Rx through multiple third leading wires LW3-1 to LW3-2. The second touch pad set 340-1 may include multiple pads and is exemplified by a single block. The second touch pad set 340-1 is configured to receive the corresponding sensing signal from the receiving electrode 203Rx. The second touch pad set 340-2 may be described with reference to and by analogy with the second touch pad set 340-1.

In the embodiment of FIG. 3, the touch and display integrated circuit 300 may also include multiple third display driving pads 350 and multiple bumps BP1 to BPN3. The third display driving pads 350 are respectively connected to the pixel circuit 204 through multiple fourth leading wires LW4-1 to LW4-N4, where N4 is a positive integer greater than 1. Specifically, an output end of a source driver (not shown) in the touch and display integrated circuit 300 is connected to the pixel circuit 204 through the third display driving pads 350. The third display driving pads 350 are configured to transmit corresponding data signals to the pixel circuit 204. In this embodiment, the third display driving pads 350 are divided into a single third display driving pad set 350, and are exemplified by a single block.

It should be noted that multiple third display driving pads 350 are disposed between the first display driving pad set 310 and the second display driving pad set 320. That is, in the X-Y plane, the leading wires LW4-1 to LW4-N4 connected to the pixel circuit 204 do not intersect with any one of the first leading wires LW1-1 and LW1-2. In this way, the various signals transmitted in the leading wires LW1-1 to LW1-2 and LW4-1 to LW4-N4 do not interfere with each other.

In this embodiment, the bumps BP1 to BPN3 are configured to connect (e.g., join) flexible printed circuits (not shown), where N3 is a positive integer greater than 1. The bumps BP1 to BPN3 are arranged in sequence in the X direction and extend in the Y direction. The quantities of the bumps BP1 to BPN3 are only examples.

In another embodiment, in the X-Y plane, one or more bumps (e.g., bumps BP1 and BPN3) disposed on the outside are inclined with respect to the Y direction. The aforementioned inclined bumps are, for example, inclined toward one or more bumps (e.g., the bump BP4) disposed at the center side, so as to have different inclination angles. It should be noted that since the inclined bumps may expand the joint area between the touch and display integrated circuit 300 and the flexible printed circuit, the inclined bumps may improve the reliability of joints in the event of deformation due to mismatch of the joint between the two as described above.

In another embodiment, the touch and display integrated circuit 300 may further include at least one dummy pad. The dummy pads are disposed between multiple adjacent metal pads to reduce signal interference applied in the metal pads. The metal pads may include, for example, the first display driving pad set 310 and the first touch pad set 330-1, the first touch pad set 330-1 and the second touch pad set 340-1, and multiple third display driving pads 350.

In the embodiment of FIG. 3, in the X-Y plane, multiple first touch pad sets (e.g., 330-1) and multiple second touch pad sets (e.g., 340-1) are sequentially staggered between the first display driving pad set 310 to the third display driving pad set 350. In addition, in the X-Y plane, multiple first touch pad sets (e.g., 330-2) and multiple second touch pad sets (e.g., 340-2) are sequentially staggered between the second display driving pad set 320 to the third display driving pad set 350.

That is, in the X direction, the first display driving pad set 310, the first touch pad set 330-1, the second touch pad set 340-1, the third display driving pad set 350, the second touch pad set 340-2, the first touch pad set 330-2, and the second display driving pad set 320 are arranged in sequence.

It should be noted that in the X-Y plane, projections of each of the first leading wires LW1-1 to LW1-2, each of the second leading wires LW2-1 to LW2-2, and each of the third leading wires LW3-1 to LW3-2 onto the substrate 205 of the touch display device TDP do not intersect with each other. In this way, the various signals transmitted in the leading wires LW1-1 to LW1-2, LW2-1 to LW2-2, and LW3-1 to LW3-2 do not interfere with each other. In addition, since the various signals do not interfere with each other, a sending cross-voltage applied to multiple first touch pad sets 330-1 to 330-2 may be increased, thereby improving the accuracy of touch.

Figure 4:
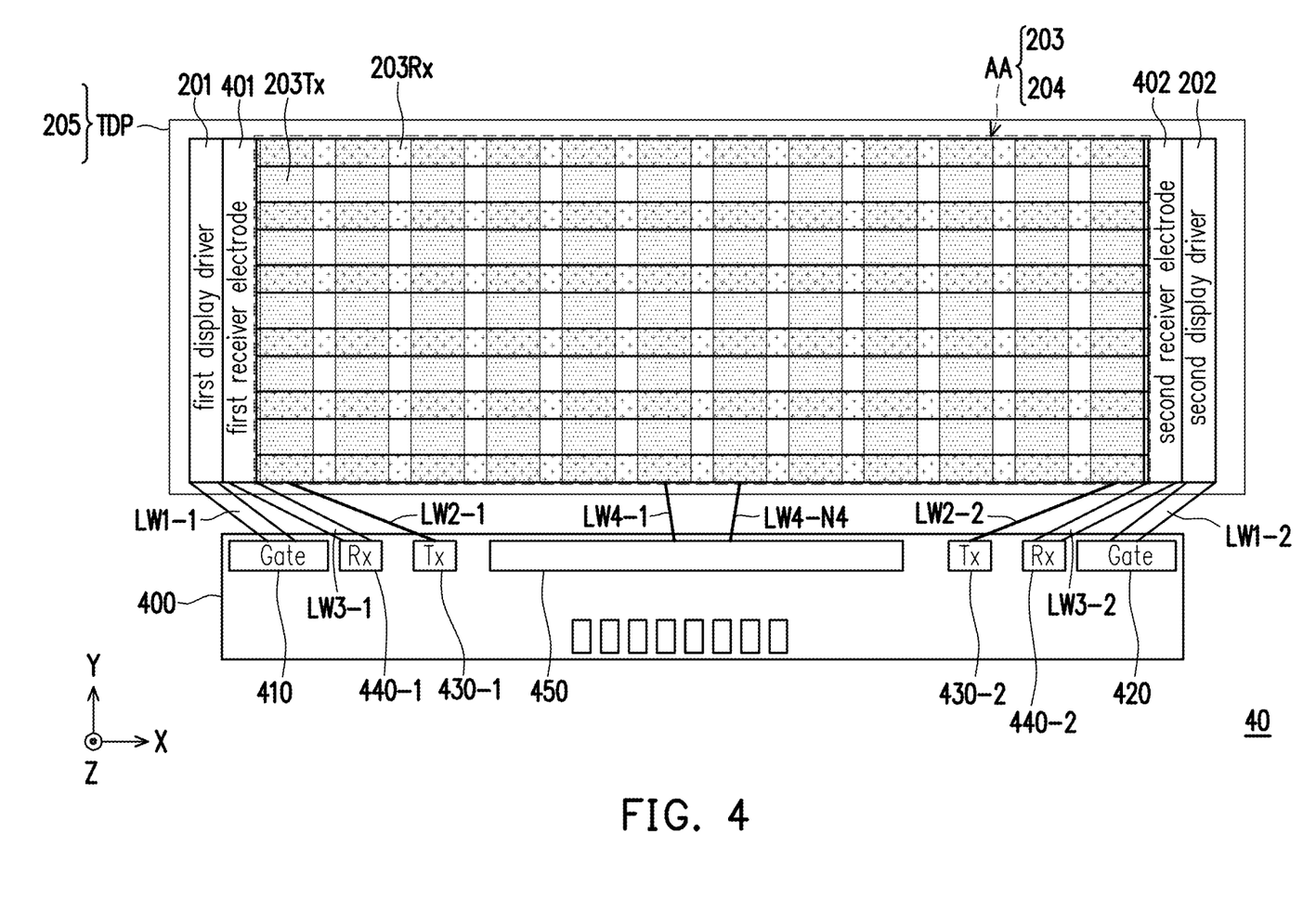
FIG. 4 is a circuit diagram of a touch and display device according to another embodiment of the disclosure.

FIG. 4 is a circuit diagram of a touch and display device according to another embodiment of the disclosure. A touch and display device 40 may be, for example, another implementation of the embodiment of FIG. 3. Compared with the embodiment of FIG. 3, the touch display device TDP may include a first receiver electrode 401, a second receiver electrode 402, and a transmitter electrode (not shown).

In this embodiment, the first receiver electrode 401 is disposed between the first display driver 201 and the touch circuit 203. The second receiver electrode 402 is disposed between the second display driver 202 and the touch circuit 203. The receiver electrodes 401 to 402 are connected to multiple receiving electrodes 203Rx. In one embodiment, the transmitter electrode is disposed within the touch display device TDP. The transmitter electrode is connected to multiple transmitting electrodes 203Tx.

In the embodiment of FIG. 4, In the X-Y plane, multiple second touch pad sets (e.g., 440-1) and multiple first touch pad sets (e.g., 430-1) are sequentially staggered between a first display driving pad set 410 to a third display driving pad set 450. In addition, in the X-Y plane, multiple second touch pad sets (e.g., 440-2) and multiple first touch pad sets (e.g., 430-2) are sequentially staggered between a second display driving pad set 420 to the third display driving pad set 450.

That is, in the X direction, the first display driving pad set 410, the second touch pad set 440-1, the first touch pad set 430-1, the third display driving pad set 450, the first touch pad set 430-2, the second touch pad set 440-2, and the second display driving pad set 420 are arranged in sequence.

Figure 5:
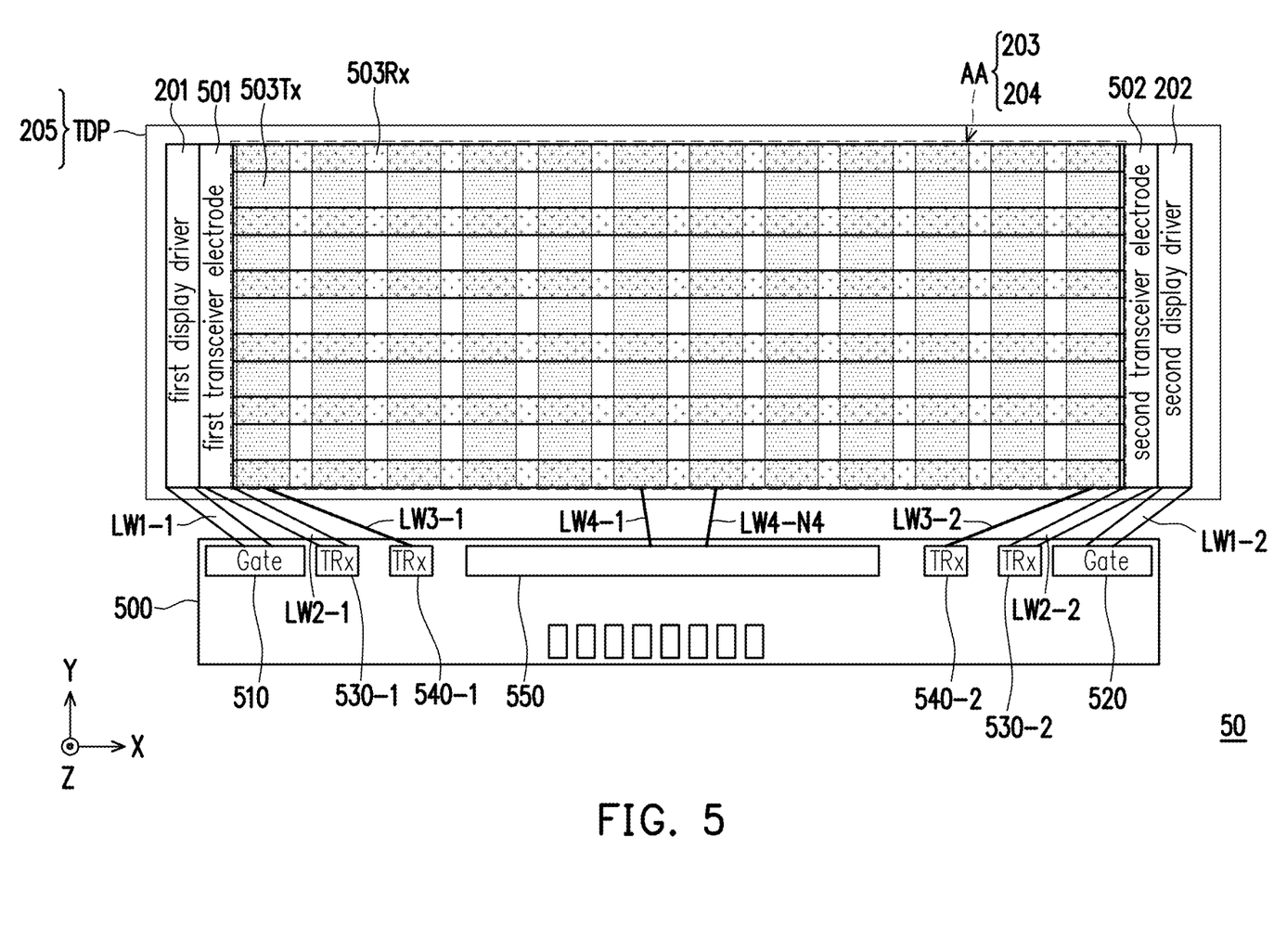
FIG. 5 is a circuit diagram of a touch and display device according to another embodiment of the disclosure.

FIG. 5 is a circuit diagram of a touch and display device according to another embodiment of the disclosure. A touch and display device 50 may be, for example, another implementation of the embodiment of FIG. 3 or FIG. 4. Compared with the embodiment of FIG. 3, the touch display device TDP may include a first transceiver electrode 501, a second transceiver electrode 502, and a third transceiver electrode (not shown).

In this embodiment, the first transceiver electrode 501 is disposed between the first display driver 201 and the touch circuit 203. The second transceiver electrode 502 is disposed between the second display driver 202 and the touch circuit 203. The transceiver electrodes 501 to 502 are connected to multiple transmitting electrodes 503Tx, for example, according to the settings of the touch circuit 203. In this embodiment, the third transceiver electrode is disposed between the touch circuit 203 and a touch and display integrated circuit 400. The third transceiver electrode is connected to multiple receiving electrodes 503Rx according to the settings of the touch circuit 203, for example.

In the embodiment of FIG. 5, the touch circuit 203 may include multiple first transceiving electrodes 503Tx and multiple second transceiving electrodes 503Rx. Based on the settings of the touch circuit 203, the first transceiving electrodes 503Tx may be used as receiving electrodes, and the second transceiving electrodes 503Rx may be used as receiving electrodes, and vice versa.

In this embodiment, multiple first touch pad sets 530-1 to 530-2 are respectively connected to the first transceiver electrode 501 and the second transceiver electrode 502 through multiple second leading wires LW2-1 to LW2-2 for further connecting to the first transceiving electrodes 503Tx. In addition, multiple second touch pad sets 540-1 to 540-2 are respectively connected to multiple second transceiving electrodes 503Rx through multiple third leading wires LW3-1 to LW3-2.

In the embodiment of FIG. 5, in the X-Y plane, multiple first touch pad sets (e.g., 530-1) and multiple second touch pad sets (e.g., 540-1) are sequentially staggered between a first display driving pad set 510 to a third display driving pad set 550. In addition, in the X-Y plane, multiple first touch pad sets (e.g., 530-2) and multiple second touch pad sets (e.g., 540-2) are sequentially staggered between a second display driving pad set 520 to the third display driving pad set 550.

That is, in the X direction, the first display driving pad set 510, the first touch pad set 530-1, the second touch pad set 540-1, the third display driving pad set 550, the second touch pad set 540-2, the first touch pad set 530-2, and the second display driving pad set 520 are arranged in sequence.

Figure 6:
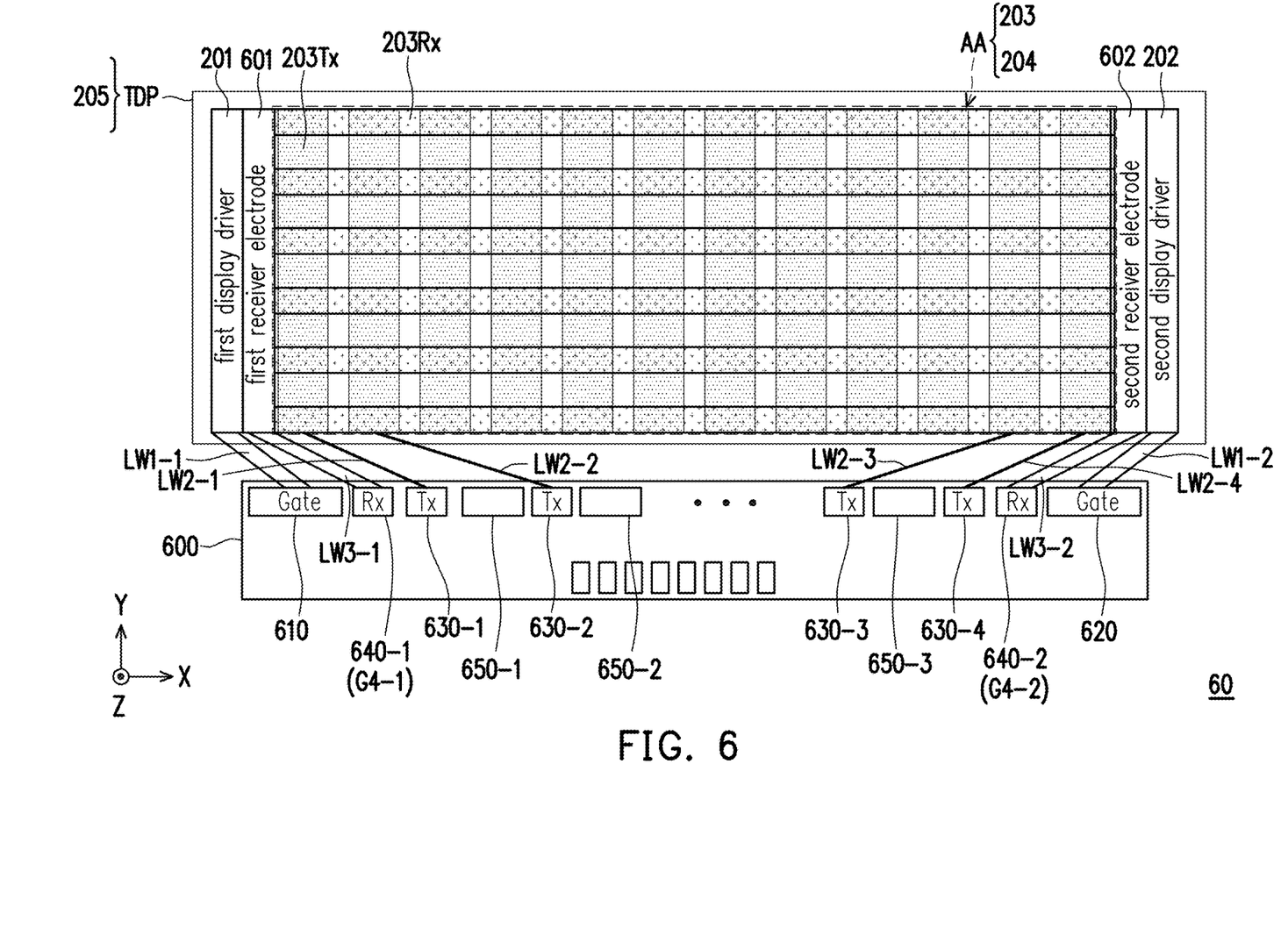
FIG. 6 is a circuit diagram of a touch and display device according to another embodiment of the disclosure.

FIG. 6 is a circuit diagram of a touch and display device according to another embodiment of the disclosure. The touch and display device 40 may be, for example, another implementation of the embodiment of FIG. 3 or FIG. 4. Compared with the embodiment of FIG. 4, multiple third display driving pads 650 are divided into multiple third display driving pad sets 650-1 to 650-3. The respective quantities of the third display driving pad sets 650-1 to 650-3 are for example only and are illustrated by a single block respectively.

In the embodiment of FIG. 6, multiple second touch pad sets 640-1 to 640-2 may include a third set G4-1 and a fourth set G4-2. In the X-Y plane, multiple first touch pad sets 630-1 to 630-4 and multiple third display driving pad sets 650-1 to 650-3 are sequentially staggered between the third set G4-1 and the fourth set G4-2.

That is, in the X direction, relative to the remaining pad sets 630-1 to 630-4 and 650-1 to 650-3, the second touch pad set 640-1 (i.e., the third set G4-1) and the second touch pad set 640-2 (i.e., the fourth set G4-2) are disposed on two sides of the periphery of a touch and display integrated circuit 600, and a first display driving pad set 610 and a second display driving pad set 620 are disposed on the outermost two sides of the touch and display integrated circuit 600. In addition, in the X direction, the pad sets 630-1 to 630-4 and 650-1 to 650-3 disposed on the relative inner side are sequentially staggered according to type. For example, the first touch pad set 630-1, the third display driving pad set 650-1, the first touch pad set 630-2, and the third display driving pad set 650-2 are staggered in the X direction.

It should be noted that since the first touch pad sets 630-1 to 630-4 are staggered with the third display driving pad sets 650-1 to 650-3, lengths of the second leading wires LW2-1 to LW2-4 may be shortened.

In the embodiment of FIG. 6, in the X direction, the first display driving pad set 610, the second touch pad set 640-1 (i.e., the third set G4-1), the first touch pad set 630-2, the third display driving pad set 650-1, the first touch pad set 630-2, the third display driving pad set 650-2, the first touch pad set 630-3, the third display driving pad set 650-3, the first touch pad set 630-4, the second touch pad set 640-2 (i.e., the fourth set G4-2), and the second display driving pad set 620 are arranged in sequence.

Figure 7:
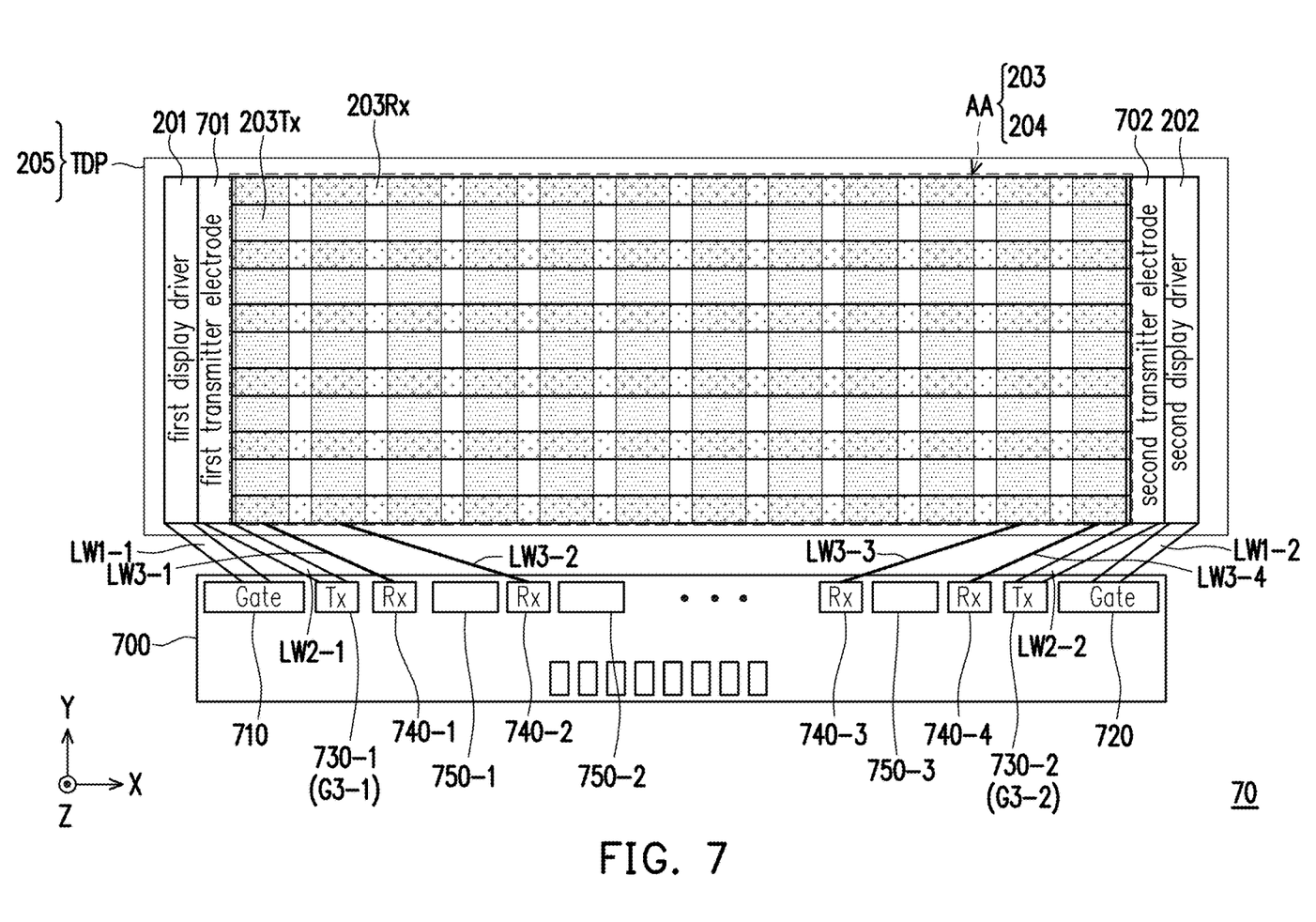
FIG. 7 is a circuit diagram of a touch and display device according to another embodiment of the disclosure.

FIG. 7 is a circuit diagram of a touch and display device according to another embodiment of the disclosure. A touch and display device 70 may be, for example, another implementation of the embodiment of FIG. 6.

In the embodiment of FIG. 7, multiple first touch pad sets 730-1 to 730-2 may include a first set G3-1 and a second set G3-2. In the X-Y plane, multiple second touch pad sets 740-1 to 740-4 and multiple third display driving pad sets 750-1 to 750-3 are sequentially staggered between the first set G3-1 and the second set G3-2.

That is, in the X direction, different types of pad sets (e.g., the second touch pad set 740-1 and the third display driving pad set 750-1) are sequentially staggered between two sides of the periphery of the touch and display integrated circuit 600 (i.e., the first touch pad sets 730-1 and 730-2).

It should be noted that since the second touch pad sets 740-1 to 740-4 are staggered with the third display driving pad sets 750-1 to 750-3, lengths of the third leading wires LW3-1 to LW3-4 may be shortened.

Figure 8:
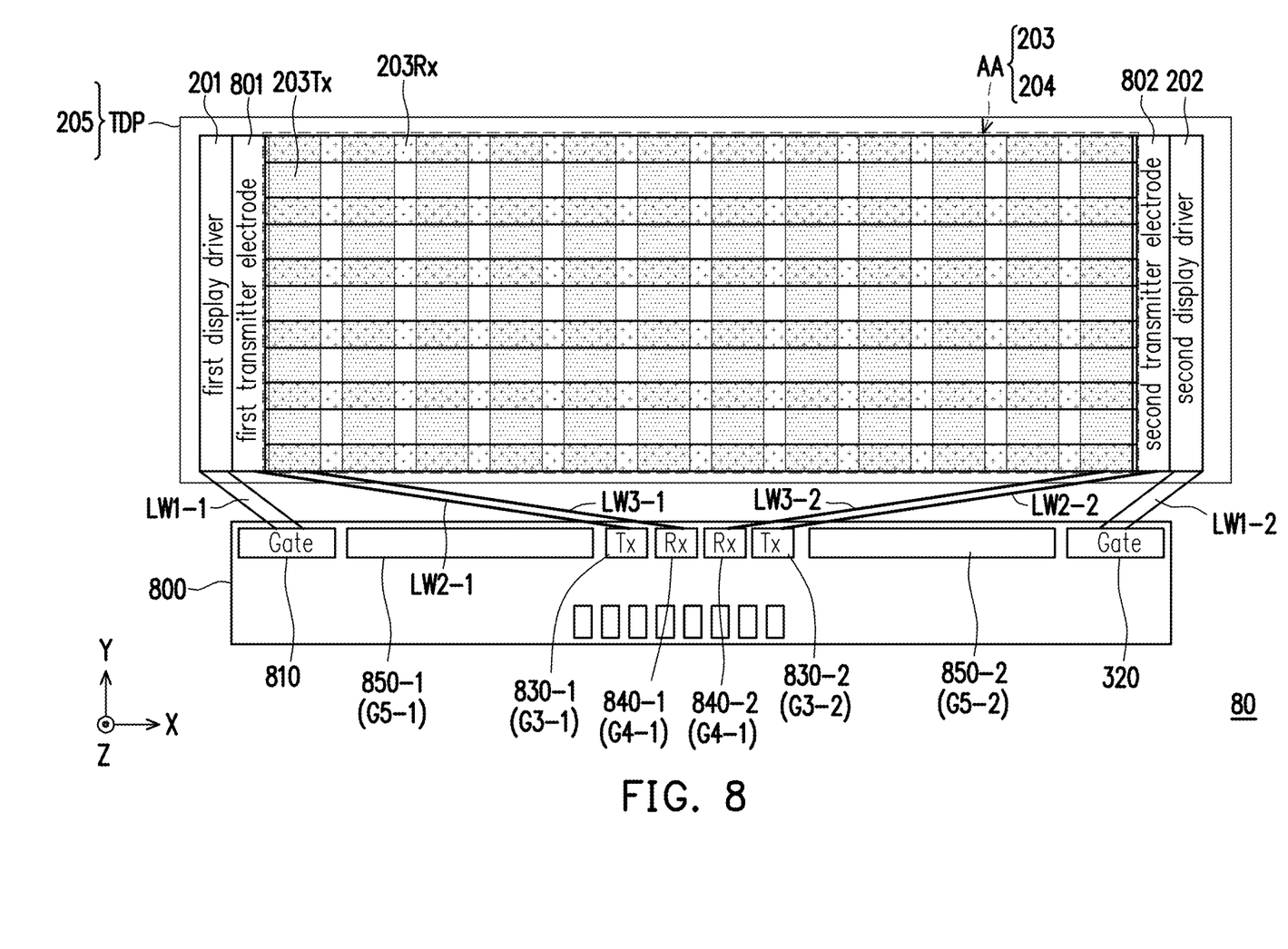
FIG. 8 is a circuit diagram of a touch and display device according to another embodiment of the disclosure.

FIG. 8 is a circuit diagram of a touch and display device according to another embodiment of the disclosure. A touch and display device 80 may be, for example, another implementation of the embodiment of FIG. 6 or FIG. 7. Compared with the embodiment of FIG. 7, multiple third display driving pads are divided into multiple third display driving pad sets 850-1 to 850-2. The third display driving pad sets 850-1 to 850-2 may include a fifth set G5-1 and a sixth set G5-2.

In the embodiment of FIG. 8, multiple first touch pad sets 830-1 to 830-2 may include a first set G3-1 and a second set G3-2. Multiple second touch pad sets 840-1 to 840-2 may include a third set G4-1 and a fourth set G4-2. In the X-Y plane, the second touch pad sets 840-1 to 840-2 are disposed between the first set G3-1 and the second set G3-2 (i.e., between the first touch pad sets 830-1 and 830-2). The first set G3-1 and the second set G3-2 (i.e., the first touch pad sets 830-1 and 830-2) are disposed between the fifth set G5-1 and the sixth set G5-2.

That is, in the X direction, the first display driving pad set 810, the third display driving pad set 850-1 (i.e., the fifth set G5-1), the first touch pad set 830-1 (i.e., the first set G3-1), the second touch pad set 840-1, the second touch pad set 840-2, the first touch pad set 830-2 (i.e., the second set G3-2), the third display driving pad set 850-2 (i.e., the sixth set G5-2), and the second display driving pad set 820 are arranged in sequence.

It should be noted that since the first touch pad sets 830-1 to 830-2 and the second touch pad sets 840-1 to 840-2 are disposed in the middle of a touch and display integrated circuit 800, the third display driving pad sets 850-1 to 850-2 may be disposed on the relative outer side of the touch and display integrated circuit 800, thereby reducing a distance between the touch display device TDP and the touch and display integrated circuit 800.

In this embodiment, the touch and display integrated circuit 800 may further include at least one function pin. The function pin may be disposed between the first touch pad set 830-1 and the second touch pad set 840-1, and/or between the first touch pad set 830-2 and the second touch pad set 840-2. The function pin may also be disposed between the second touch pad sets 840-1 to 840-2.

Figure 9:
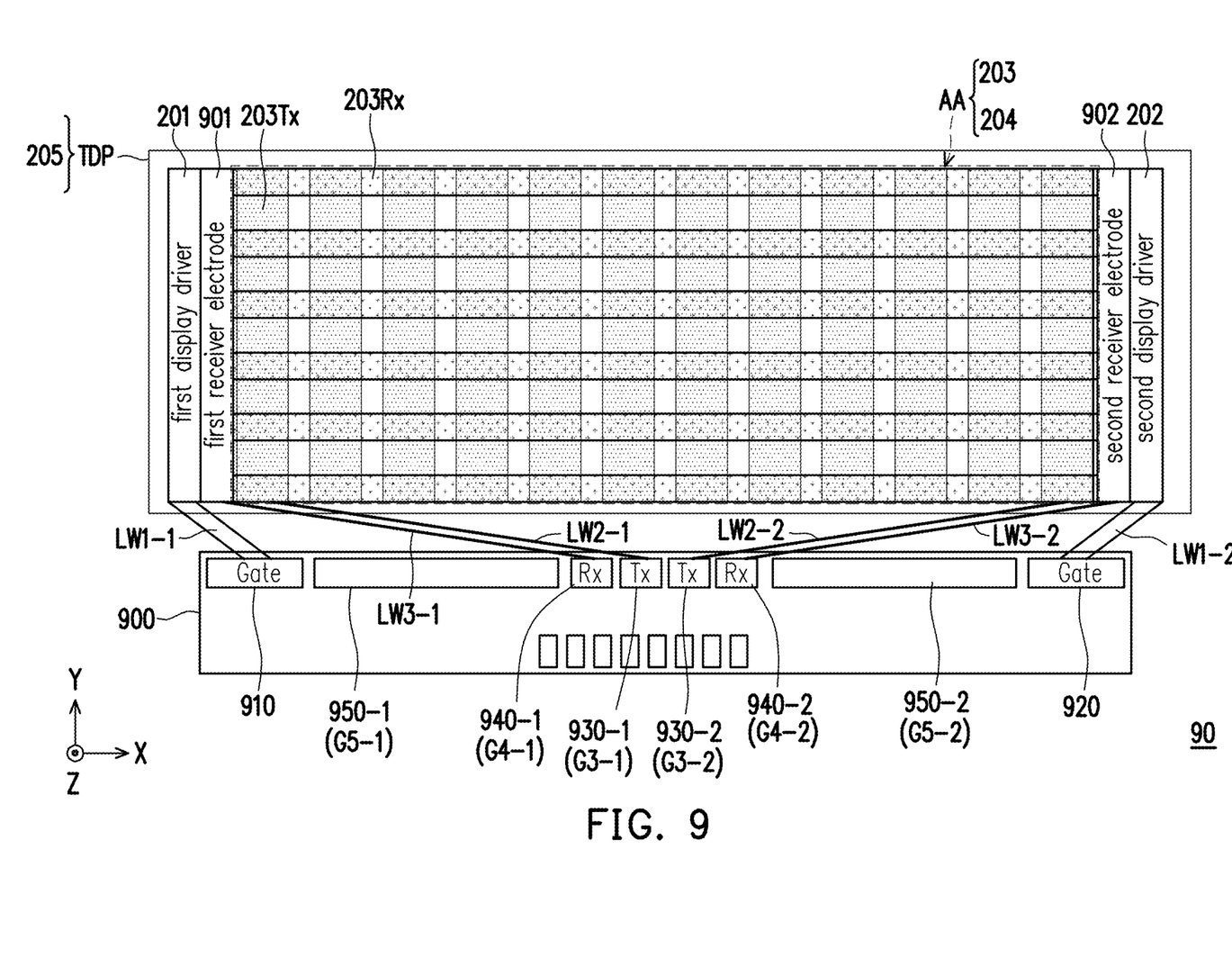
FIG. 9 is a circuit diagram of a touch and display device according to another embodiment of the disclosure.

FIG. 9 is a circuit diagram of a touch and display device according to another embodiment of the disclosure. A touch and display device 90 may be, for example, another implementation of the embodiment of FIG. 8.

In the embodiment of FIG. 9, multiple first touch pad sets 930-1 to 930-2 may include a first set G3-1 and a second set G3-2. Multiple second touch pad sets 940-1 to 940-2 may include a third set G4-1 and a fourth set G4-2. In the X-Y plane, the first touch pad sets 930-1 to 930-2 are disposed between the third set G4-1 and the fourth set G4-2 (i.e., between the second touch pad sets 940-1 and 940-2). The third set G4-1 and the fourth set G4-2 (i.e., the second touch pad sets 940-1 and 940-2) are disposed between the fifth set G5-1 and the sixth set G5-2 (i.e., third display driving pad sets 950-1 and 950-2).

That is, in the X direction, a first display driving pad set 910, the third display driving pad set 950-1 (i.e., the fifth set G5-1), the second touch pad set 940-1 (i.e., the third set G4-1), the first touch pad set 930-1, the first touch pad set 930-2, the second touch pad set 940-2 (i.e., the fourth set G4-2), the third display driving pad set 950-2 (i.e., the sixth set G5-2), and a second display driving pad set 920 are arranged in sequence.

Figure 10:
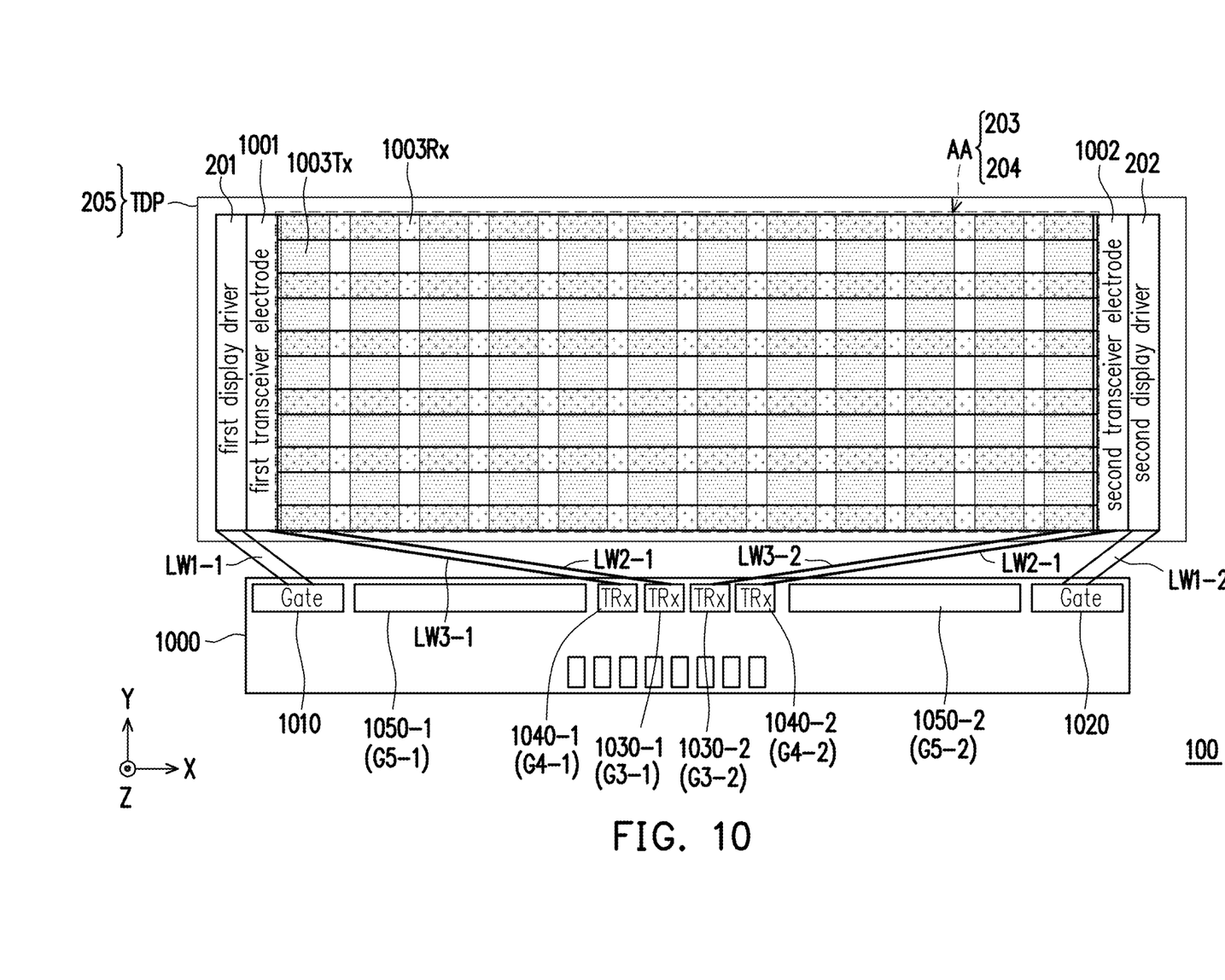
FIG. 10 is a circuit diagram of a touch and display device according to another embodiment of the disclosure.

FIG. 10 is a circuit diagram of a touch and display device according to another embodiment of the disclosure. A touch and display device 100 may be, for example, another implementation of the embodiment of FIG. 8 or FIG. 9. Compared with the embodiment of FIG. 9, the touch display device TDP may include a first transceiver electrode 1001, a second transceiver electrode 1002, and a third transceiver electrode (not shown). The transceiver electrodes 1001 to 1002 may be described with reference to and by analogy with the transceiver electrodes 501 to 502 in the embodiment of FIG. 5.

In the embodiment of FIG. 10, the touch circuit 203 may include multiple first transceiving electrodes 1003Tx and multiple second transceiving electrodes 1003Rx. Based on the settings of the touch circuit 203, the first transceiving electrodes 1003Tx may be used as receiving electrodes, and the second transceiving electrodes 1003Rx may be used as receiving electrodes, and vice versa.

In this embodiment, multiple first touch pad sets 1030-1 to 1030-2 are respectively connected to the first transceiver electrode 1001 and the second transceiver electrode 1002 through multiple second leading wires LW2-1 to LW2-2 for further connecting to the first transceiving electrodes 1003Tx. In addition, multiple second touch pad sets 1040-1 to 1040-2 are respectively connected to the second transceiving electrodes 1003Rx through multiple third leading wires LW3-1~LW3-2.

In the embodiment of FIG. 10, multiple first touch pad sets 1030-1 to 1030-2 may include a first set G3-1 and a second set G3-2. Multiple second touch pad sets 1040-1 to 1040-2 may include a third set G4-1 and a fourth set G4-2. In the X-Y plane, the first touch pad sets 1030-1 to 1030-2 are disposed between the third set G4-1 and the fourth set G4-2 (i.e., between the second touch pad sets 1040-1 and 1040-2). The third set G4-1 and the fourth set G4-2 (i.e., the second touch pad sets 1040-1 and 1040-2) are disposed between the fifth set G5-1 and the sixth set G5-2 (i.e., third display driving pad sets 1050-1 and 1050-2).

That is, in the X direction, a first display driving pad set 1010, the third display driving pad set 1050-1 (i.e., the fifth set G5-1), the second touch pad set 1040-1 (i.e., the third set G4-1), the first touch pad set 1030-1, the first touch pad set 1030-2, the second touch pad set 1040-2 (i.e., the fourth set G4-2), the third display driving pad set 1050-2 (i.e., the sixth set G5-2), and a second display driving pad set 1020 are arranged in sequence.

Figure 11:
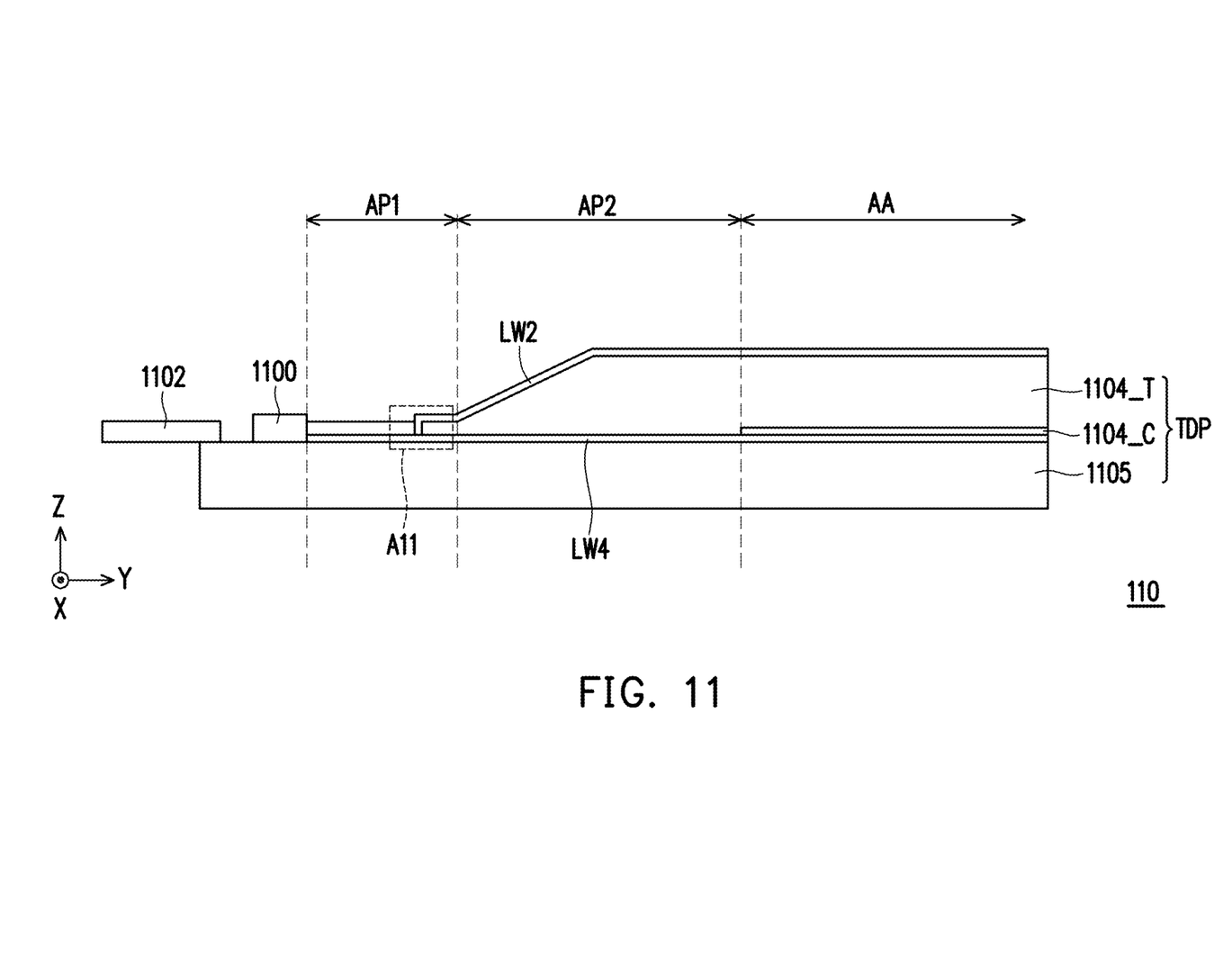
FIG. 11 is a partial cross-sectional diagram of a touch and display device according to an embodiment of the disclosure.

FIG. 11 is a partial cross-sectional diagram of a touch and display device according to an embodiment of the disclosure. Referring to FIG. 11, a touch and display device 110 may include a touch and display integrated circuit 1100, a touch display device TDP, and a flexible printed circuit 1102.

In this embodiment, the touch display device TDP may include a substrate 1105, an OLED electrode (e.g., cathode) layer 1104_C, and an encapsulation (e.g., thin film encapsulation (TFE)) layer 1104_T. In the Z direction, the substrate 1105, the OLED electrode layer 1104_C, and the encapsulation layer 1104_T overlap in sequence.

In the X-Y plane, the touch display device TDP may include multiple regions AP1 to AP2 and AA. The region AP1 is located in the peripheral region, and may be, for example, a fanout region of the leading wire. The region AP2 is located in the peripheral region, and may be, for example, a taper region. The region AA may, for example, be an active region (hereinafter referred to as active region AA).

In this embodiment, the fourth leading wire LW4 connecting the pixel circuit and the third display driving pad is, for example, disposed between the substrate 1105 and the encapsulation layer 1104_T. In different regions AP1 to AP2 and AA, the fourth leading wire LW4 is disposed on the same metal layer. In the active region AA, the fourth leading wire LW4 is connected to the corresponding pixel unit. The fourth leading wire LW4 extends from the touch and display integrated circuit 1100 to the touch display device TDP. The OLED electrode layer 1104_C is disposed on the fourth leading wire LW4.

In this embodiment, the second leading wire LW2 connecting the touch circuit and the touch pad set (e.g., the first touch pad set) is disposed on the encapsulation layer 1104_T to connect the corresponding touch electrode (e.g., the transmitting electrode 203Tx) in the active region AA. In different regions AP1 to AP2, the second leading wire LW2 is disposed on different metal layers.

In detail, in a region A11 of the region AP1, the second leading wire LW2 extends in the Z direction to conduct vertically between different metal layers. In the region A11, the second leading wire LW2 and the fourth leading wire LW4 are separately disposed on different metal layers. In other regions of the region AP1, the second leading wire LW2 and the fourth leading wire LW4 are disposed on the same metal layer. The second leading wire LW2 extends from the touch and display integrated circuit 1100 to the transmitting electrode 203Tx.

In another embodiment, the second leading wire LW2 may be disposed on the same metal layer as the fourth leading wire LW4.

Figure 12:
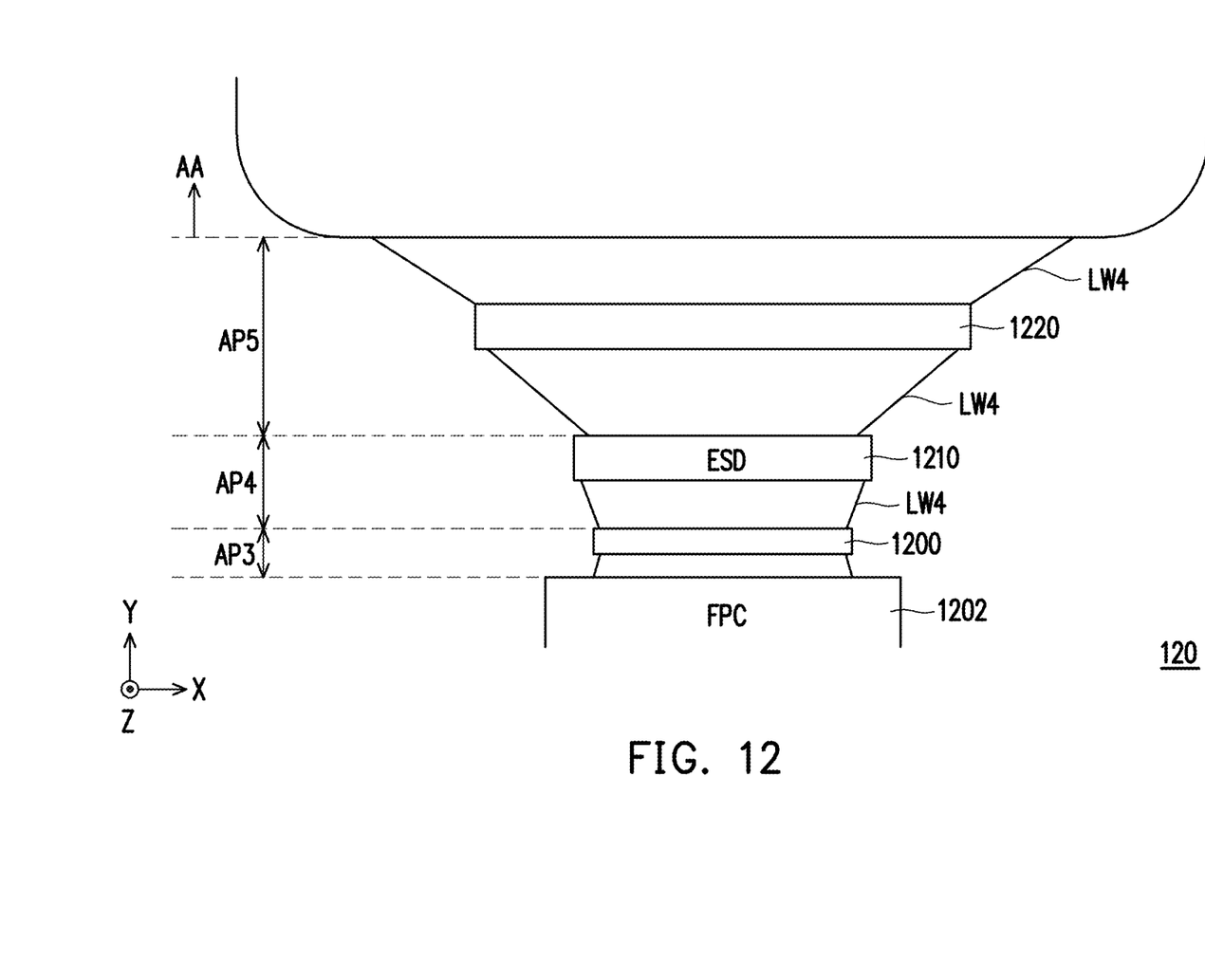
FIG. 12 is a partial top diagram of a touch and display device according to an embodiment of the disclosure.

Referring to FIG. 12 together, FIG. 12 is a partial top diagram of a touch and display device according to an embodiment of the disclosure. Referring to FIG. 12, in this embodiment, a touch and display device 120 may include an electrostatic discharge (ESD) circuit 1210, a touch and display integrated circuit 1200, a touch display device (not shown in FIG. 12), a flexible printed circuit 1202, and a bending board 1220.

In the X-Y plane, the touch and display device 120 may include multiple continuous regions AP3 to AP5 and AA. The regions AP3 to AP5 are located in the peripheral region and include multiple fanout regions respectively. The region AA may, for example, be an active region (hereinafter referred to as active region AA).

Specifically, in the region AP3, the touch and display integrated circuit 1200 is connected to the flexible printed circuit 1202 through multiple leading wires, where the leading wires are spread out in a fan shape. In the region AP4, the touch and display integrated circuit 1200 is connected to the electrostatic discharge circuit 1210 through multiple fourth leading wires LW4, where the fourth leading wires LW4 are spread out in a fan shape.

In the region AP5, the electrostatic discharge circuit 1210 is connected to the bending board 1220 through multiple fourth leading wires LW4. In addition, the bending board 1220 is also connected to the pixel circuit in the active region AA through the fourth leading wires LW4. In this way, through the bending board 1220 connected between the electrostatic discharge circuit 1210 and the pixel circuit, the fourth leading wires LW4 may be extended and spread out in a fan shape.

It should be noted that the fourth leading wires LW4 connecting the pixel circuit and the third display driving pad, and the second leading wires LW2 connecting the touch circuit and the first touch pad set are separated in the region AP5 and are disposed on different metal layers. That is, the fourth leading wires LW4 used for display and the second leading wires LW2 used for touch control are disposed on different metal layers between the electrostatic discharge circuit 1210 and the pixel circuit.

In another embodiment, the respective quantities of extension configurations corresponding to the bending board 1220 and the fourth leading wire LW4 may be plural, or may be omitted.

To sum up, in the touch and display integrated circuit and the touch and display device of the embodiments of the disclosure, by disposing multiple pad sets (i.e., the first touch pad set and the second touch pad set) applying the touch function between gate driving pad sets on two sides, projections of multiple leading wires connected to the touch circuit and multiple leading wires connected to the gate driver onto the base do not overlap with each other. Therefore, the various signals transmitted in the leading wires do not interfere with each other, thus improving the signal-to-noise ratio of the signals applied to the touch and display device. In some embodiments, the leading wires connecting the touch circuit may be shortened by distributing source driving pad sets (i.e., the third display driving pad sets) between the pads applying the touch function.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch and display integrated circuit, adapted to drive a touch display device, comprising:
   a first display driving pad set and a second display driving pad set, connected to a first display driver and a second display driver on the touch display device through a plurality of first leading wires respectively;

a plurality of first touch pad sets, connected to a touch circuit on the touch display device through a plurality of second leading wires; and a plurality of second touch pad sets, connected to the touch circuit through a plurality of third leading wires, wherein the first touch pad sets and the second touch pad sets are disposed between the first display driving pad set and the second display driving pad set, wherein the touch circuit comprises a plurality of transmitting electrodes and a plurality of receiving electrodes, wherein the first touch pad sets are respectively connected to the transmitting electrodes through the second leading wires, and the second touch pad sets are respectively connected to the receiving electrodes through the third leading wires.

2. The touch and display integrated circuit according to claim 1, wherein projections of each of the first leading wires, each of the second leading wires, and each of the third leading wires onto a substrate of the touch display device do not intersect with each other.

3. The touch and display integrated circuit according to claim 1 further comprising:

a plurality of third display driving pads, connected to a pixel circuit on the touch display device through a plurality of fourth leading wires, wherein the third display driving pads are disposed between the first display driving pad set and the second display driving pad set.

4. The touch and display integrated circuit according to claim 3, wherein the third display driving pads are divided into a third display driving pad set, or into a plurality of third display driving pad sets.

5. The touch and display integrated circuit according to claim 4, wherein the first touch pad sets and the second touch pad sets are sequentially staggered between the first display driving pad set to the third display driving pad set, and are sequentially staggered between the second display driving pad set to the third display driving pad set.

6. The touch and display integrated circuit according to claim 4, wherein the second touch pad sets and the first touch pad sets are sequentially staggered between the first display driving pad set to the third display driving pad set, and are sequentially staggered between the second display driving pad set to the third display driving pad set.

7. The touch and display integrated circuit according to claim 4, wherein the first touch pad sets comprise a first set and a second set, wherein the second touch pad sets and the third display driving pad sets are sequentially staggered between the first set and the second set.

8. The touch and display integrated circuit according to claim 4, wherein the second touch pad sets comprise a third set and a fourth set, wherein the first touch pad sets and the third display driving pad sets are sequentially staggered between the third set and the fourth set.

9. The touch and display integrated circuit according to claim 4, wherein the first touch pad sets comprise a first set and a second set, and the third display driving pad sets comprise a fifth set and a sixth set, wherein the second touch pad sets are disposed between the first set and the second set, and the first set and the second set are disposed between the fifth set and the sixth set.

10. The touch and display integrated circuit according to claim 4, wherein the second touch pad sets comprise a third set and a fourth set, and the third display driving pad sets comprise a fifth set and a sixth set, wherein the first touch pad sets are disposed between the third set and the fourth set, and the third set and the fourth set are disposed between the fifth set and the sixth set.

11. A touch and display device, comprising:

a touch display device, comprising a first display driver, a second display driver, and a touch circuit; and a touch and display integrated circuit, configured to drive the touch display device, comprising:

a first display driving pad set and a second display driving pad set, connected to the first display driver and the second display driver through a plurality of first leading wires respectively;

a plurality of first touch pad sets, connected to the touch circuit through a plurality of second leading wires; and a plurality of second touch pad sets, connected to the touch circuit through a plurality of third leading wires, wherein the first touch pad sets and the second touch pad sets are disposed between the first display driving pad set and the second display driving pad set, wherein the touch circuit comprises a plurality of transmitting electrodes and a plurality of receiving electrodes, wherein the first touch pad sets are respectively connected to the transmitting electrodes through the second leading wires, and the second touch pad sets are respectively connected to the receiving electrodes through the third leading wires.

* * * * *